United States Patent [19]

Suzuki

[11] Patent Number: 5,355,505
[45] Date of Patent: Oct. 11, 1994

[54] METHOD FOR SIMULTANEOUSLY SORTING DATA ARRANGEMENT WITHIN MOVABLE DEMARCATED BLOCKS

[75] Inventor: Toyokazu Suzuki, Hitachi, Japan
[73] Assignee: Hitachi, Ltd., Tokyo, Japan
[21] Appl. No.: 444,860
[22] Filed: Dec. 4, 1989

[30] Foreign Application Priority Data

Dec. 7, 1988 [JP] Japan ................................. 63-309146

[51] Int. Cl.⁵ ............................................. G06F 15/40
[52] U.S. Cl. ................................. 395/800; 364/222.9; 364/225.6; 364/237.2
[58] Field of Search ............... 395/100, 800, 650, 111, 395/135; 340/721, 722, 723

[56] References Cited

U.S. PATENT DOCUMENTS

| | | | |
|---|---|---|---|
| 4,520,457 | 5/1985 | Hagler et al. | 395/155 |
| 4,868,785 | 9/1989 | Jordan et al. | 395/140 |
| 4,879,648 | 11/1989 | Cochran et al. | 395/275 |
| 4,937,739 | 6/1990 | Ernst et al. | 395/800 |
| 4,958,147 | 9/1990 | Kanema et al. | 340/706 |
| 4,977,536 | 12/1990 | Shimamura | 395/800 |
| 4,985,842 | 1/1991 | Ward | 364/478 |
| 5,058,036 | 10/1991 | Nakasuji et al. | 364/518 |

FOREIGN PATENT DOCUMENTS

| | | |
|---|---|---|
| 60220451 | 11/1985 | Japan . |
| 62254264 | 11/1987 | Japan . |
| 6336476 | 2/1988 | Japan . |
| 2-02455 | 3/1990 | Japan . |
| 02-29863 | 4/1990 | Japan . |

*Primary Examiner*—Parshotam S. Lall
*Assistant Examiner*—Krisna Lim
*Attorney, Agent, or Firm*—Antonelli, Terry, Stout & Kraus

[57] ABSTRACT

A list data sorting control method carried out by a data processing apparatus. Blocks are generated for demarcating or dividing meaningfully list data displayed on a display device. The list data located within the block are handled as movable units to be moved for rearranging the list data. When a plurality of the blocks bear inclusion relation to one another, rearrangement of the list data is performed in accordance with the inclusion relation.

2 Claims, 15 Drawing Sheets

FIG. 6

| SORT BASE | KEY COLUMN OF FIRST KEY | OBJECTIVE OF FIRST KEY | SORT SEQUENCE OF FIRST KEY | KEY COLUMN OF SECOND KEY | OBJECTIVE OF SECOND KEY | SORT SEQUENCE OF SECOND KEY | KEY COLUMN OF THIRD KEY | OBJECTIVE OF THIRD KEY | SORT SEQUENCE OF THIRD KEY | |
|---|---|---|---|---|---|---|---|---|---|---|

PLEASE INPUT CONDITIONS FOR SORT

UNIT FOR SORT : ○ ONE ROW  ● PLURAL ROWS

FIRST KEY COLUMN [ ] COLUMN
  OBJECTIVE : ● NUMERAL  ○ CHARACTER
  SEQUENCING IN SORTING : ● DESCENDING  ○ ASCENDING

SECOND KEY COLUMN [ ] COLUMN
  OBJECTIVE : ● NUMERAL  ○ CHARACTER
  SEQUENCING IN SORTING : ● DESCENDING  ○ ASCENDING

THIRD KEY COLUMN [ ] COLUMN
  OBJECTIVE : ● NUMERAL  ○ CHARACTER
  SEQUENCING IN SORTING : ● DESCENDING

FIG. 8
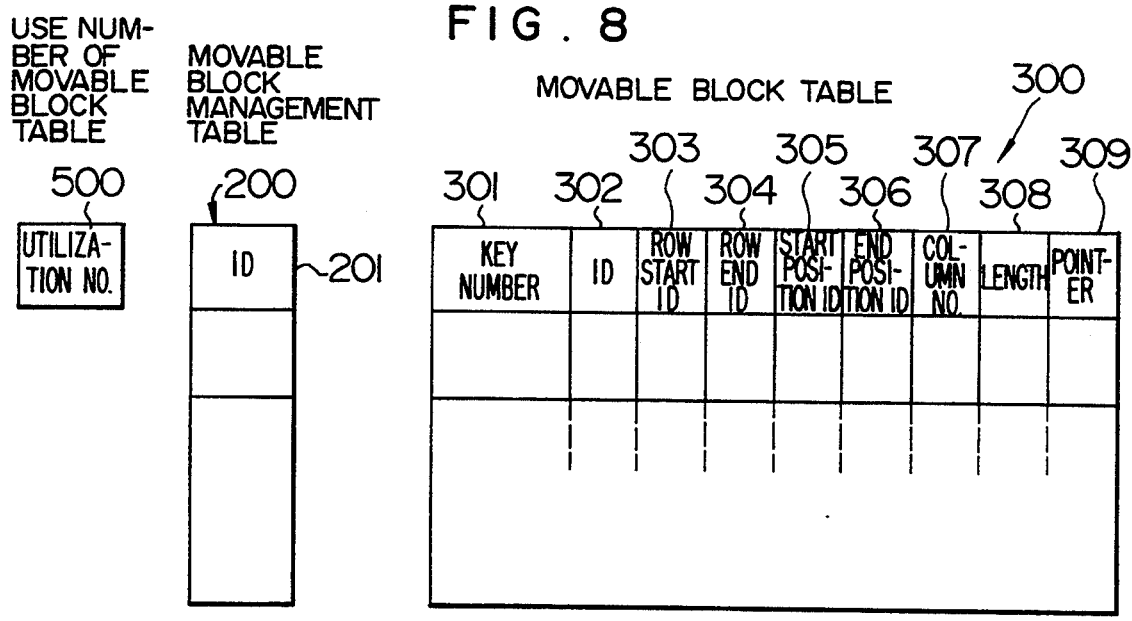
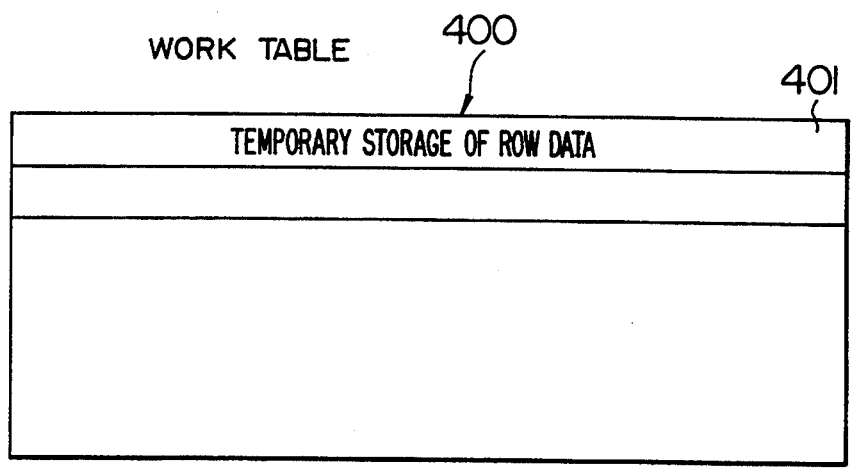
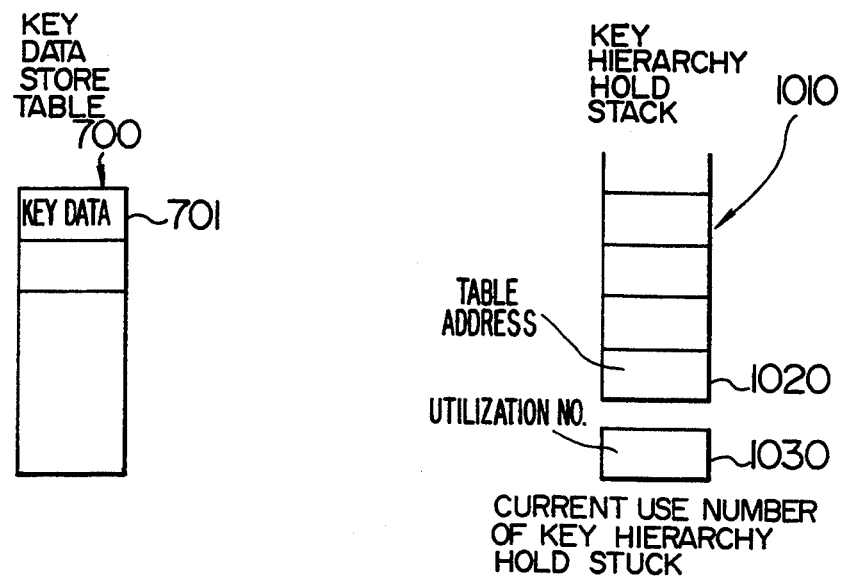

FIG. 12

| POSITION No. 1 | 5 6 | | 11 | 21 | 29 |
|---|---|---|---|---|---|
| | BANK NAME | BANK CODE | (DEPOSIT ACCOUNT) | | |
| | | | DUE DATE | AMOUNT | |
| ROW No. 1 | A BANK | G013 | 60/12/20 | 40,000,000 | |
| 2 | | | 62/03/31 | 50,000,000 | |
| 3 | | | 63/04/30 | 90,000,000 | |
| 4 | B BANK | G001 | 61/03/20 | 10,000,000 | |
| 5 | | | 62/03/20 | 15,000,000 | |
| 6 | | | 62/09/25 | 10,000,000 | |
| 7 | | | 63/04/30 | 35,000,000 | |
| 8 | C CREDIT UNION | G010 | 61/05/25 | 5,000,000 | |
| 9 | | | 62/05/25 | 5,000,000 | |
| 10 | | | 63/04/30 | 10,000,000 | |
| 11 | D MUTUAL FINANCING BANK | G100 | 61/07/10 | 3,000,000 | |
| 12 | | | 62/05/30 | 3,000,000 | |

| | | | | |
|---|---|---|---|---|
| HORIZON. | 1 | 11 | 1 | 29 |
| HORIZON. | 2 | 11 | 2 | 29 |
| HORIZON. | 3 | 1 | 3 | 29 |
| HORIZON. | 4 | 11 | 4 | 29 |
| | | | | |
| VERTICAL | 1 | 1 | 12 | 1 |
| VERTICAL | 1 | 5 | 12 | 5 |
| VERTICAL | 1 | 6 | 12 | 6 |
| VERTICAL | 1 | 11 | 12 | 11 |
| VERTICAL | 1 | 21 | 12 | 21 |
| VERTICAL | 1 | 29 | 12 | 29 |

30, 31

| B BANK | G001 | 63 / 04 / 30 | 35,000,000 |
|---|---|---|---|
| | | 62 / 03 / 20 | 15,000,000 |
| | | 61 / 03 / 20 | 10,000,000 |
| | | 62 / 09 / 25 | 10,000,000 |
| C CREDIT UNION | G010 | 63 / 04 / 30 | 10,000,000 |
| | | 61 / 05 / 25 | 5,000,000 |
| | | 62 / 05 / 25 | 5,000,000 |
| A BANK | G013 | 63 / 04 / 30 | 90,000,000 |
| | | 62 / 03 / 31 | 50,000,000 |
| | | 60 / 12 / 20 | 40,000,000 |
| D MUTUAL FINANCING BANK | G100 | 61 / 07 / 10 | 3,000,000 |
| | | 62 / 05 / 30 | 3,000,000 |

FIG. 18

| BANK NAME | BANK CODE | DEPOSIT ACCOUNT ||
| --- | --- | --- | --- |
| | | DUE DATE | AMOUNT |
| B BANK | G001 | 63/04/30 | 35,000,000 |
| | | 62/03/20 | 15,000,000 |
| | | 61/03/20 | 10,000,000 |
| | | 62/09/25 | 10,000,000 |
| C CREDIT UNION | G010 | 63/04/30 | 10,000,000 |
| | | 61/05/25 | 5,000,000 |
| | | 62/05/25 | 5,000,000 |
| A BANK | G013 | 63/04/30 | 90,000,000 |
| | | 62/03/31 | 50,000,000 |
| | | 60/12/20 | 40,000,000 |
| D MUTUAL FINANCING BANK | G100 | 61/07/10 | 3,000,000 |
| | | 62/05/30 | 3,000,000 |

METHOD FOR SIMULTANEOUSLY SORTING DATA ARRANGEMENT WITHIN MOVABLE DEMARCATED BLOCKS

BACKGROUND OF THE INVENTION

The present invention generally relates to a data processing apparatus having a list creating or generating function. More particularly, the invention is concerned with a list sort control method which allows list sort processing to be performed blockwise on a plural-row basis.

Of data processors such as word processors, personal computers and the like known heretofore, there exist those which are imparted with a function of creating or generating a list which contains data arrayed or arranged in the form of rows and columns, which data will hereinafter be referred to as list data. Many of the data processing apparatuses having the list creating function is imparted with a list data sorting function for determining relative magnitudes of values of the list data in a given row or column (hereinafter referred to as row data or column data) and rearranging the row data (or column data) in such a manner that the row data (or column data) are arrayed in an ascending order or sequence (i.e. in the order of small to large data values) or in a descending order (i.e. in the order or sequence of large to small data values). The column providing a basis for determining the magnitudes for the sequencing is referred to as the sort key which can be designated by the operator. In general, a column of numeric data is ordinarily designated as the sort key. Besides, a column of literal characters such as alphabet, kana (Japanese syllabary alphabet) or the like can also be designated as the key column. In the latter case, magnitudes or sequence of the literal characters is determined by making use of appropriate character codes.

Further, it is also practiced to designate simultaneously a plurality of columns as keys, wherein the sort is performed by assigning priority levels to the key columns. These keys are performed by assigning priority levels to the key columns. These keys are termed a first key, a second key, a third key and so forth. In the case, the sorting is so performed that the data or items of the first key are rearranged, wherein for the row data determined to be of a same level in the rearrangement performed for the first key, the sequence relation is determined by using the second key, while for the row data determined to be of a same level in the rearrangement performed with reference to the second key, the sequence relation is then determined by using the third key and so forth. In this manner, the sorting is performed by changing sequentially the keys from the high to low priority level.

As the prior art data processing techniques for the list data arrayed in rows and columns, there can be mentioned those disclosed in JP-A-60-220451, JP-A-62-254264 and JP-A-63-36476.

The prior art data processing apparatuses suffer from the problems in respect regard to the list data sorting function, which will be discussed below.

In the list data sorting known heretofore, a unit to be moved or manipulated for the rearrangement consists unexceptionally of one row (or one column), and determination of magnitudes or levels of the key data is performed on a row basis (i.e. row by row). There exists however the need for preparing or processing a list containing a meaningful set of data which are distributed among a plurality of rows. By way of example, let's suppose that list data shown in FIG. 18 of the accompanying drawings are to be sorted in accordance with the prior art sorting method. As can be seen in FIG. 18, there are assigned a plurality of rows to one bank, wherein each of the column labeled "BANK NAME" and the column labeled "BANK CODE" contains only one datum over a plurality of rows. To say in another way, there arise blank rows containing no data for the columns "BANK NAME" and "BANK CODE", respectively.

Accordingly, when the decision of the key data for magnitude or sequence thereof is performed on a row basis for the list data as shown in FIG. 18 to thereby rearrange the data row by row according to the prior art list data sorting method, the blank areas are regarded as the data. As a result the data for the different banks will mixedly be rearranged, giving rise to a problem. This problem can certainly be solved by placing the same data in the blank areas. (In the case of the list shown in FIG. 18, the blank rows of the columns "BANK NAME" and "BANK CODE" are all filled with the same bank name and the same bank code, respectively.) In that case, however, a new problem will arise in that the ease of seeing and understanding the list data is seriously disturbed or impaired.

SUMMARY OF THE INVENTION

It is an object of the present invention to provide a list data sort control method capable of sorting list data simultaneously for a plurality of rows in a block and a data processing apparatus for carrying out the method.

For achieving the object mentioned above, there is provided according to an aspect of the present invention a list data sort control method for rearranging list data with the aid of a data processing apparatus wherein lines demarcating the list data are detected, and the data items located within a block demarcated by the lines is handled as one unit which can be moved as a whole upon rearrangement of the list data. A demarcating line is not limited to a solid line but may assume other various line forms such as broken lines, dotted lines, waveform lines or the like so far as the list data can be demarcated by them.

According to another aspect of the present invention, the list data sort control method for rearranging the list data items by using a data processing apparatus provides that the blocks resulting from the demarcation are recognized, whereon the data items located in each of the blocks is handled as a unit which can be moved or manipulated upon rearrangement of the list data. As a method of demarcating the list data, there can be mentioned in addition to the use of the demarcating lines the utilization of shading or hatching or coloration which differ alternately from one to another region to be handled as the movable unit which includes a plurality of rows. In any case, the information for the demarcation is stored in terms of the attributes for display in association with the locations at which the corresponding data items are to be displayed. Accordingly, by checking the contents as stored, it is possible to detect the relevant blocks resulting from the demarcation.

According to a further aspect of the present invention, there is provided a list data sort control method for rearranging the row data of a list containing data in an array of rows and columns with reference to the data of a designated column by using a data processing apparatus, wherein the method provides that the blocks resulting from demarcation of the data in the designated column are recognized, wherein all the rows located within the each of the blocks is handled as a unit capable of being moved or manipulated for rearrangement or permutation.

When a plurality of columns are designated as the reference for the sorting, it is preferred to check inclusion relation of the blocks for the plurality of columns and assign the priority levels to the columns in the descending sequence, starting from the column having the greatest inclusion. Alternately, it is of course possible to assign the priority levels in the order commanded by the operator.

According to a further aspect of the invention, there is provided a list data sort control method for rearranging the row data with reference to the data located at the column designated by the operator in a list of data arrayed in rows and columns by using a data processing apparatus. The method comprises a step of indexing units to be moved or manipulated (hereinafter referred to also as a movable blocks) upon sorting of list data on the basis of inputted demarcating lines, a step of cutting out the data within the designated column for each of the movable blocks as indexed, and a step of sequencing the cut-out data through comparison thereof to thereby rearrange the list data in accordance with the sequence for each of the movable blocks.

In a preferred mode for carrying out the list data sort control method described just above, a step for prompting selection of "one row" or "plural rows" as the movable block (i.e. unit to be moved or manipulated) may be provided in precedence to the step of indexing the movable blocks, wherein upon selection of "plural rows", the processing proceeds to the step of indexing the movable block, while upon selection of "one row", the step of cutting out the data in the designated row is executed by handling the one row as the movable block.

According to an aspect of the present invention, there is proposed a data processing apparatus incorporating a list data sorting function for rearranging the row data items of list data presented in rows and columns. The apparatus comprises input apparatus for inputting list data, demarcating line information and designated column information, a display for displaying a list on a display screen in accordance with the list data and the information of demarcating lines as inputted, an indexer for indexing a movable blocks to be manipulated upon sorting list data by detecting the lines demarcating the data of the column designated by the column designating information, cut-out apparatus for cutting out the data located in the designated column for each of the movable blocks indexed by the indexer, and a sequence for sequencing the data cut out by the cut-out apparatus and rearranging the list data on a movable block basis.

According to another aspect of the invention, there is provided a data processing apparatus imparted with a function for sorting list data on the basis of movable blocks each constituted by a demarcated list block. The apparatus comprises checking apparatus for checking inclusion relation of the blocks for a plurality of columns designated as the reference for the sorting, an assignor for assigning priority levels in the descending sequence, starting from the column having the greatest inclusion, and control a controller for performing the sorting of the list data sequentially on a column basis, starting from the column having the highest priority level.

According to still another aspect of the present invention, there is provided a method of using a data processing apparatus incorporating the list data sorting function mentioned above. The apparatus performing the step of drawing demarcating lines for demarcating the row on the movable block basis upon rearrangement for each column in the list data displayed on the display screen in precedence to the list data sorting or the plural row basis.

In conjunction with the terms "row" and "column" used herein, it should be understood that an array of data items which can be designated as the key to serve as the reference for the sorting is termed "column". However, such definition is only for the convenience of description, and "row" can be designated as the key for the sorting.

Further, it is should be added that the phrase "list data" is used with the intention to mean the data which is composed of literal and/or numeric characters and which can be written or printed out in the form, for example, of slips, booking sheets, spread sheets, notes and the like. Generally speaking, all kinds of character arrays or arrangements can be grouped into the list data in the sense defined above.

With the present invention, it is contemplated that when a list created or generated by a data processing apparatus includes a set of coordinated list data over a plurality of rows, sorting of the list data is accomplished in such a manner that the list data distributed in a set among a plurality of rows are not disturbed by the sorting. To this end, the operator can input, for example, the information for demarcating the list data such that the list data can be divided into blocks each including a plurality of rows, whereon the data processing apparatus operates to recognize or identify the blocks.

When the list data sorting is commanded for a unit including a plurality of rows by the operator, the data processing apparatus detects the inputted demarcating line to recognize the movable block and executes the sort processing for the movable block. Since the movable blocks of a list can automatically be detected separately from one another, the number of the rows included in the movable unit need not be constant for all the movable blocks but may vary rather arbitrarily from one to another unit.

In most of the lists created in the practical applications, there may exist a plurality of columns which can serve as the reference for the sort. In that case, it is preferred that a plurality of columns can simultaneously be designated as the key columns to serve as the reference for the sorting. Further, in that case, when inclusion relation of the movable blocks exists internally of the plurality of designated columns, it is preferred that the key columns should be defined sequentially as the first key, second key, third key and so forth, starting from the key columns of the movable block having the greatest inclusion. Assignment of such priority level can be realized in accordance with the corresponding command by the operator. However, it is also possible to assign automatically the priority levels by the data processing apparatus itself. The sort procedure activated in response to the designation of a plurality of keys is performed in such a manner in which the rearrangement of the movable blocks on the plural rows is carried out first for the first key, while the movable blocks of the second key or the succeeding key, if any, are rearranged within the movable block indexed at the time of sorting executed by using the key preceeding immediately to the second or succeeding key. In this way, a plurality of rows in a set can be protected against unwanted segmentation due to the sort processing.

Parenthetically, when the operator neglects to designate the column including the movable block of plural rows upon designation of the key column to serve as the reference for the sorting, there arises a possibility that the plural rows in the movable unit may be segmented after the sorting. With a view to coping with this problem, it is preferred to make arrangement such that the designation by the operator is detected by the data processing apparatus which is so designed as to generate an alarm message upon detection of the negligence of the operator. Alternatively, the data processing apparatus may be so arranged that even when the column including the movable block of plural rows is not designated, the data processing apparatus can automatically decide that the column of this type is designated.

BRIEF DESCRIPTION OF THE DRAWINGS

FIG. 5 is a view showing a display of information for prompting the operator to input the conditions for the sorting;

FIG. 6 is a diagram showing schematically a structure of a table for storing the conditions for the sorting;

FIG. 8 is a schematic diagram showing structures of tables used upon sorting of the list data;

FIG. 12 is a view showing a list in the state in which the operator has demarcated movable blocks by drawing demarcating lines;

FIG. 18 is a view showing the original state of display in which the demarcating lines shown in FIG. 17 have been erased.

DESCRIPTION OF THE PREFERRED EMBODIMENTS

Now, the present invention will be described in detail in conjunction with preferred or exemplary embodiments thereof by reference to the drawings.

Figure 2A:
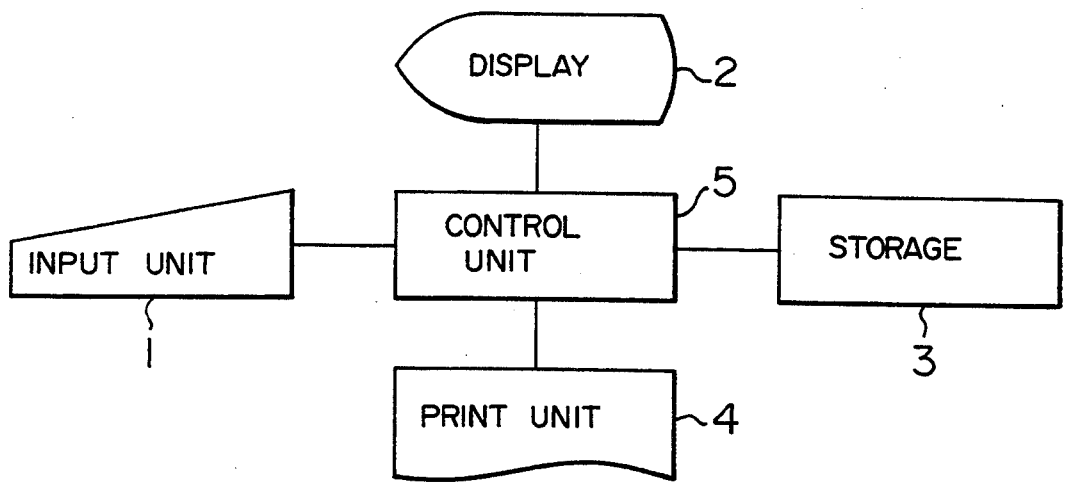
FIG. 2A is a block diagram showing a general arrangement of a data processing apparatus according to an embodiment of the invention for carrying out the list data sort control method of the invention.

FIG. 2A is a block diagram showing a general arrangement of a data processing apparatus imparted with a list data generating function and a list data sorting function according to an embodiment of the present invention is applied.

As can be seen in FIG. 2A, the data processing apparatus is composed of an input unit 1 which may be constituted by a keyboard or the like for inputting character data, commands and others, a display unit 2 such as, for example, a cathode ray tube (CRT) display for displaying list information or data represented by literal and/or numeric characters, a storage unit 3 constituted, for example, by a semiconductor memory, a magnetic storage system or the like for storing the list data as generated, various tables which will be described after on and other data, a printing unit 4 which may be constituted by a wire dot printer or the like, and a control unit 5 constituted by a microprocessor or the like for controlling the various units mentioned above.

Figure 2B:
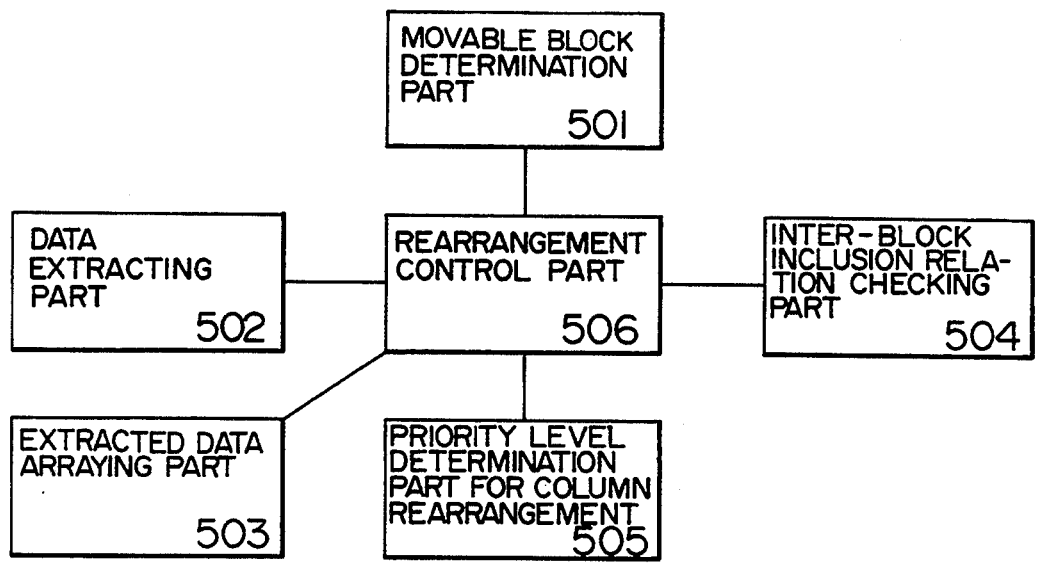
FIG. 2B is a block diagram showing a configuration of a control unit constituting a major part of the data processing apparatus shown in FIG. 2A.

FIG. 2B is a functional block diagram of the control unit 5, the structure and functions of which will be explained below.

The control block 5 is composed of a movable unit determination part 501 for determining the units to be moved upon sorting of the list data by recognizing demarcating lines dividing the data on the basis of the input demarcating line information, a data extracting part 502 for extracting data for every movable block determined by the movable block determination part 501, an extracted data arranging or arraying part 503 for determining the sequence or order of the data extracted by the data extracting part 402 through comparison, an inclusion relation checking part 504 for checking inclusion relation of blocks among a plurality of columns when they are designated as the reference for the sorting, a priority level determination part 505 for determining the priority levels on the basis of the inclusion relation and, a permutation or rearrangement control part 506 for controlling the movable block determination part 501, the data extracting part 502, the extracted data arraying or sequencing part 503, the inclusion relation check part 504 and the priority level determination part 505 mentioned above. The rearrangement control part 506 serves for rearranging the list data in accordance with the sequence designated by the extracted data determination part 503. For those data which bear the inclusion relation to one another, the rearrangement control part 506 mentioned above performs the rearrangement of the data in accordance with both the sequence or order designated by the extracted data arraying part 503 and the priority levels designated by the priority level determination part 505.

Figure 3:
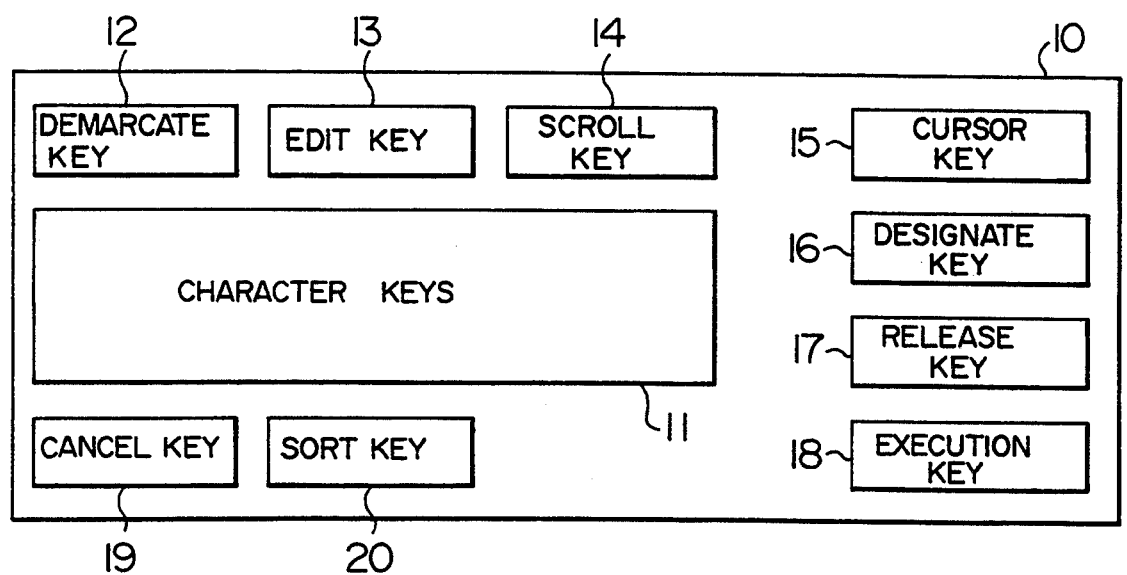
FIG. 3 is a top plan view showing schematically a key array of an input unit constituting a part of the data processing apparatus shown in FIG. 2A.

FIG. 3 is a view showing schematically a keyboard 10 which constitutes a part of the input unit 1 mentioned above. The keyboard 1 includes a character key filed 11 for inputting character data, a demarcating line key 12, an edition key 13 for commanding edition of the inputted characters, a scrolling key 14 for scrolling the displayed image, cursor keys 15 for moving a cursor upward, downward, leftward and rightward selectively, a designation key 16 for designating an objective to be manipulated, a releasing key 17 for releasing the objective for manipulation from the designated state, an execution key 18 for commanding execution of the edition, a cancel key 19 for canceling the edition as commanded, and a sort key 20 for commanding execution of the sorting.

Creation (or generation) and edition of the list data by the data processing apparatus according to the instant embodiment of the invention are carried out in such a manner as described below.

Figure 4:
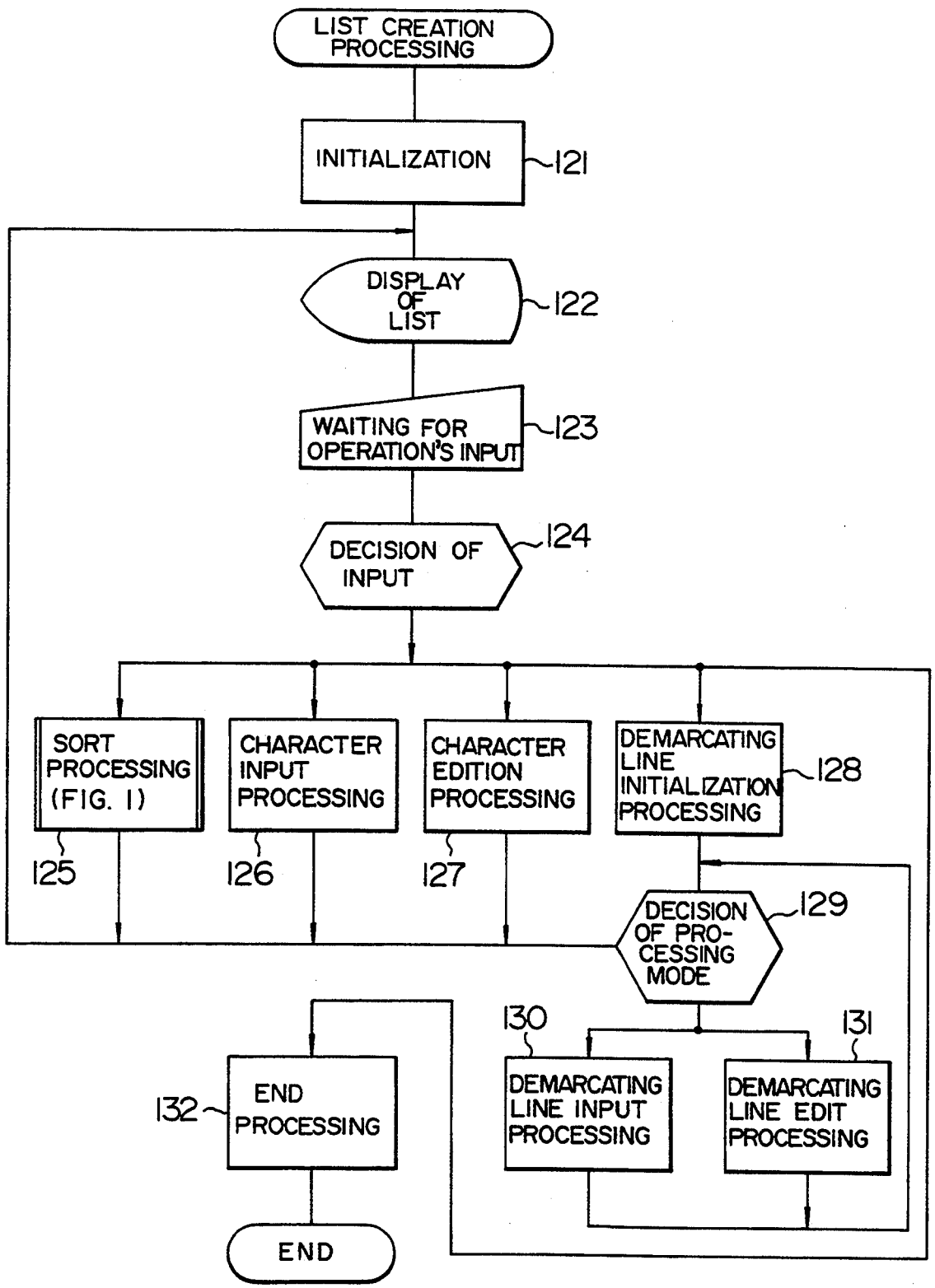
FIG. 4 is a flow chart for illustrating a list creation (generation) processing.

When the operator commands creation or generation of a new list or updating of list data already created, starting from the initial state, the control unit 5 is first activated. The processing performed by the activated control unit 5 is illustrated in FIG. 4. Referring to the figure, the control unit 5 makes decision as to whether the operator command is to create (generate) a new list or to update the list already created. When creation of the new list is commanded, the list data is initialized. On the other hand, when the updating is commanded, the list data to be updated are recalled from the storage unit 3 (step 121 in FIG. 4). Subsequently, the control unit 5 displays the list on the display unit 2 (step 122), whereon the operator's inputting of the edition command is waited for (step 123). In response to the operator's inputting, decision is made as to the inputted command (step 124). If the command is inputted through actuation of the sort key 20, the sort processing is performed (step 125). If the input is made with the aid of the character keys 11, a character input processing is performed (step 126). Further, when the edition key 13 is actuated, an edition processing of characters and demarcating lines is carried out (step 127). Upon operation of the demarcating line key 12, input and edition processing for the demarcating lines can take place.

It is now assumed that the demarcating line key 12 is actuated. In this case, the processing mode is set to the input mode as the initial processing, whereon a demarcating line table 30 for storing the information required for the inputting/edition of the demarcating lines which will be described hereinafter is initialized (step 128). Thereafter, decision is made as to the processing mode (step 129). If the processing mode is the input mode, the demarcating line input processing is performed (step 130). On the other hand, if the mode is the edition mode, the edition processing is executed (step 131). Parenthetically, when indication is issued that the demarcating line input processing or the demarcating line edition processing comes to an end, the step 122 is regained, whereupon the character edition processing is again performed. When the end of the list edition processing is indicated at the input decision step 124, the list data as generated or created are stored in the storage unit 3, whereupon the edition of the list is completed (step 132).

Figure 7:
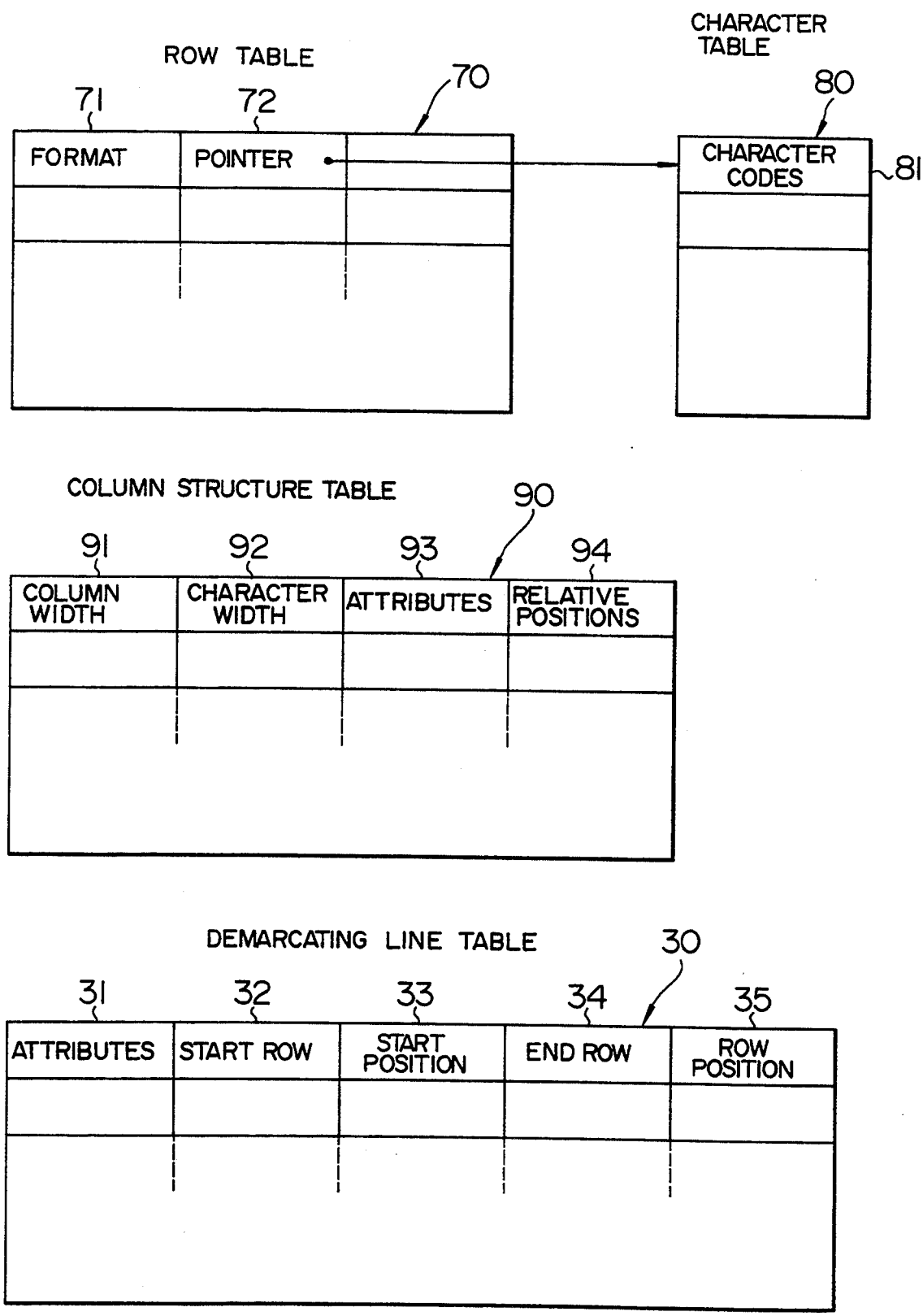
FIG. 7 is a schematic diagram showing tables storing data which constitute a list.

Structures of the list data will now be described by reference to FIG. 7. The list data are available in the form of a row table 70, a character table 80, a demarcating line table 30 and a column table 90. The structures of these tables will be described below.

Row table 70

This table serves for managing the information concerning the rows existing in a list, which information includes format information 71 (such as, for example, inter-character spaces, inter-row spaces or line space and the like) for each row and start character pointers 72 for every rows.

Character table 80

This table serves to hold all the character information inputted for a list of concern in terms of character codes 81.

Demarcating line table 30

This table holds all the demarcating line information generated for a list of concern in the order of the horizontal demarcating line to the vertical demarcating line. In case the horizontal and vertical demarcating lines are present each in plurality, the demarcating line information is held in such a manner in which the start row positions of the horizontal demarcating lines and the vertical demarcating lines, respectively, are arrayed in an ascending order. The demarcating line information may include attribute information 31 indicating line species, directions and the line widths of the inputted demarcating lines, information of the position of the start row 32, row start row position 33, end row position 34 and the row end positions 35.

Column Structure table 90

This is a table for managing the information of columns which are present in the list of concern. The information includes widths of the individual columns as denoted by 91, character widths (em and en) 92, column attributes (numeral string, character string) 93 and relative positions 94 indicating the positions from the column start position of the rows.

Next, description will be made of the tables which are used in the sort processing. Referring to FIG. 8, the tables used in the sort processing include a move block management table 200, a movable block table 300, a work table 400, a movable block table utilizations number table 500 and a key data storage table 700. These table will be explained below.

Movable block management table 200

This table serves to manage the arrays of the movable units stored in the move block table 300 and holds the identification numbers 201 of the individual movable units.

Movable block table 300

This table contains key numbers 301 of the individual movable units, identification numbers 302 of the columns which have the key data for the individual movable units, row start identification numbers 303 of the individual movable units, row end identification numbers 304 of the individual movable units, start position identification numbers 305 of the individual movable units, end position identification number 306 of the individual movable units, the numbers of columns 307 constituting the individual movable units, respectively, lengths 308 of the key data for the individual movable units, respectively, and pointers 309 indicating the relevant locations of the key data storage table 700 for the individual movable units, respectively.

Work table 400

This table includes a storage area 401 for holding temporarily the row data when the row data of the list is moved slip.

Movable block table utilization number table 500

This table comprises a memory area for storing the number of times the movable block table is referred to or utilized.

Key data storage table 700

This table serves to store the key data of the individual movable units and has a memory area 701 for storing the data and the attributes on a character basis.

Key hierarchy hold Stack 1010

This stack includes memory areas 1020 for storing a location on the movable block table where the information of the movable unit having the key of a highest hierarchical level of two or more movable units being currently extracted is stored, when the two or more keys are designated.

Current use number memory area 1030 of key hierarchy hold stack

This memory area is provided for storing the current number indicating how many times the key hierarchy hold stack has been used till now.

Figure 1:
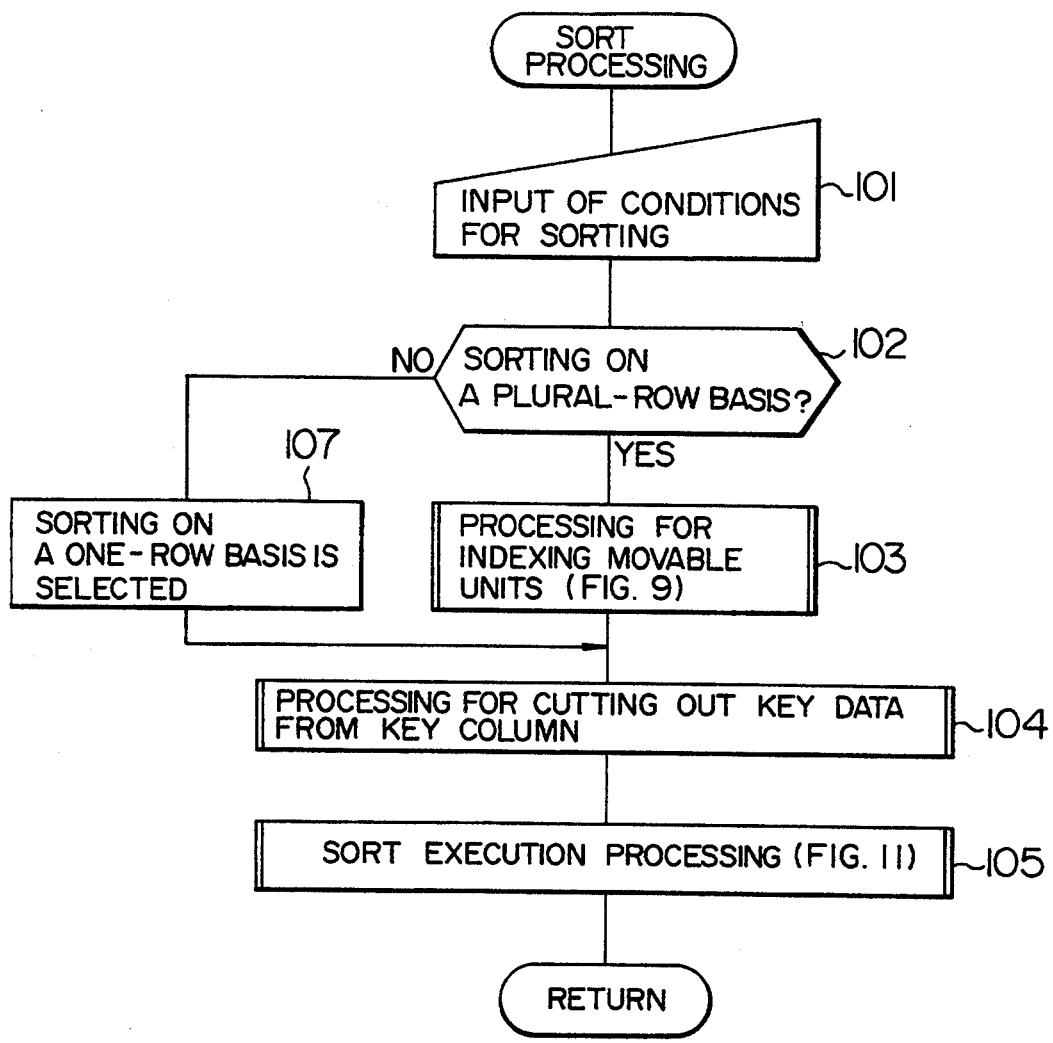
FIG. 1 is a flow chart for illustrating a list data sorting control method according to an embodiment of the present invention.

Now, the sort processing executed at the step 125 will be explained by reference to FIG. 1.

At first, such a choice or selection menu as illustrated in FIG. 5 is displayed on the display screen for prompting the operator to input the commands for selection (step 101). In response to the operator's input, the content of the sort condition table shown in FIG. 6 is updated and decision is made as to the updated content (step 102). When the content of the sort unit 61 is "one row", the sort processing is executed on a row basis (i.e. row by row) at steps 104 and 105 by using as the key the column data stored in the column row 62 (step 107).

On the other hand, when the content of the sort unit 61 indicates "plural rows", the movable unit is indexed on the basis of the content of the demarcating line table 30, the result of which is stored in the move block table 300 at the locations for the key number 301 of the movable unit, the column number 302 having the key data for the movable unit, the start row number 303 of the movable unit, the end row number 304 of the movable unit, the start position number 305 of the movable unit, the end position number 306 of the movable unit and the number of rows constituting the movable unit 307 respectively.

Further, the block numbers of the individual movable units are stored as the initial values in the ascending order, starting from the smallest, in the movable block management table 200 at the locations allocated to the block numbers 201 of the individual movable units (step 103).

Now, referring to FIG. 9 description is directed to the processing for indexing the movable unit from the content of the demarcating line table 30.

Figure 9A:
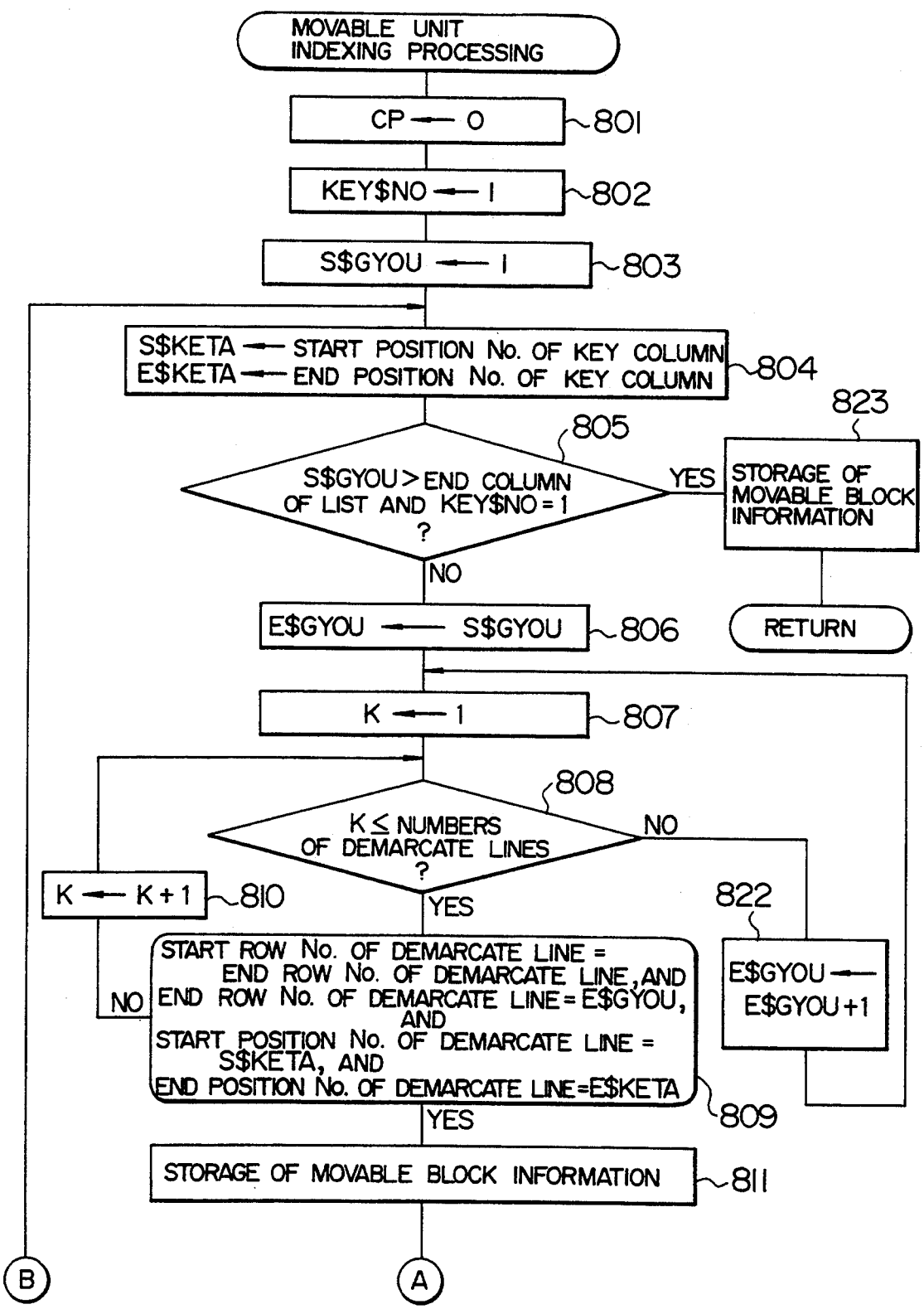
FIGS. 9A and 9B are flow charts for illustrating in what manner a movable block indexing processing step (103) shown in FIG. 1 can be executed.
Figure 9B:
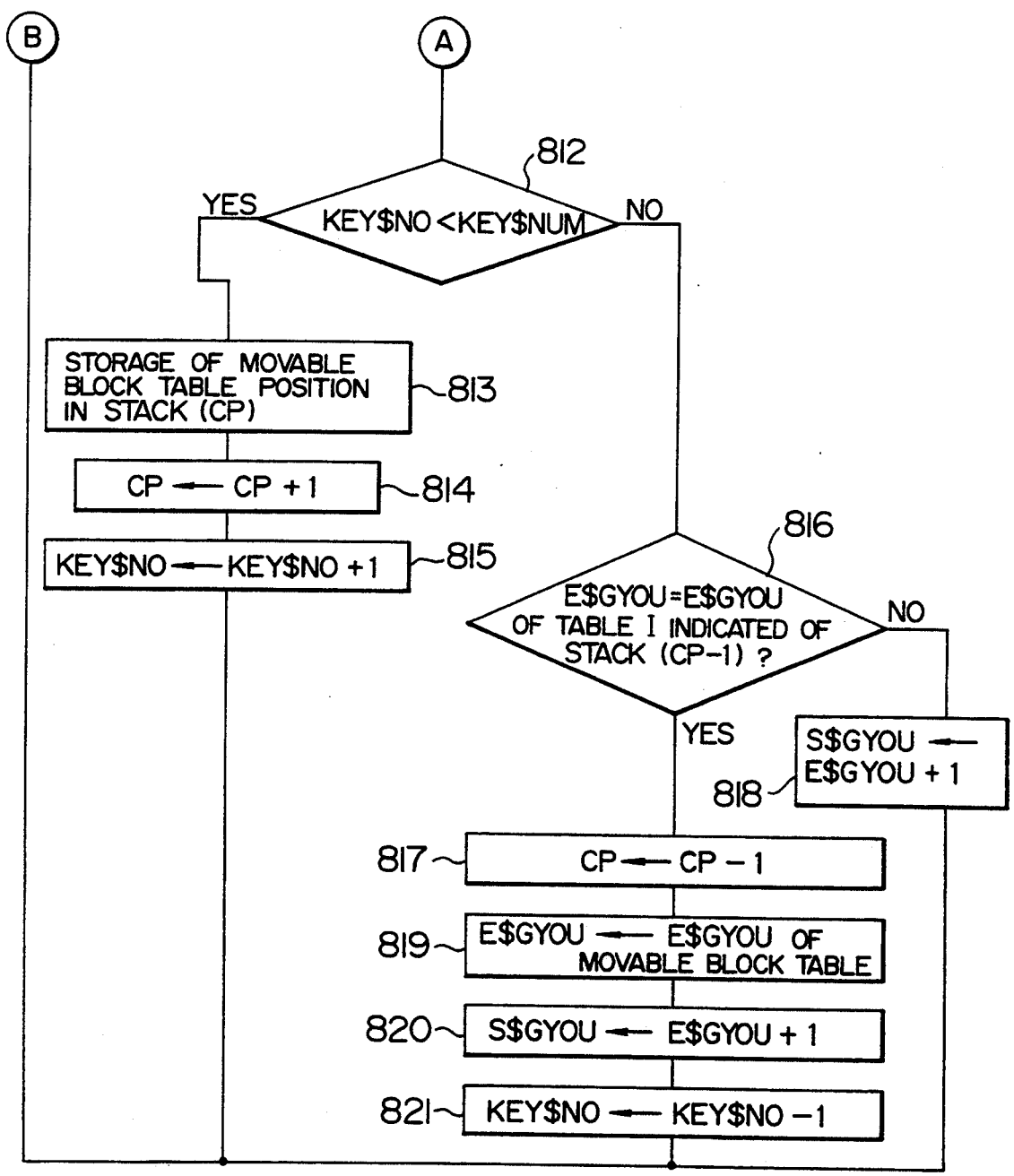

In FIGS. 9A and 9B, "STACK" represents the key hierarchy hold stack 1010, "CP" represents the current utilization number 1030 of the key hierarchy hold stack, "KEY$ON" represents the key number of the movable unit being currently indexed, "S$KETA" represents the start position number of the key column, "E$KETA" represents the end position number of the key column, and "S$GYOU" and "E$GYOU" represent the start row number and the end row number of the movable unit, respectively.

In the first place, initial values "0", "1" and "1" are placed in "CP", "KEY$NO" and "S$GYOU", respectively 9 steps 801 to 803). Subsequently, the start position number and the end position number of the key column indicated by "KEY$NO" are placed in "S$KETA" and "E$KETA", respectively (step 804). Then, it is checked whether or not the value of "S$KETA" is greater than the end row number of the list and "KEY$NO" is equal to "1" (step 805). If the answer of this decision step is negative (No), the value of "E$GYOU" is replaced by that of "S$GYOU" (step 806).

Subsequently, an affix variable K is set to the initial value "1" for searching the demarcating line table (step 807). Next, the value of the variable K is compared with the number of the demarcating lines, i.e. the number of times the demarcating line table has been used (step 808). When the value of the variable K is smaller than the number of the demarcating lines inclusive, a processing step 809 is executed. More specifically, at the step 809, decision is made through comparison as to whether or not the start row number of the demarcating line K is equal to the end row number (i.e. whether or not the demarcating line K is horizontal), whether or not the start row number of the demarcating line K is equal to the value of "E$GYOU" inclusive, whether or not the start position number of the demarcating line K is smaller than the value of "S$KETA" inclusive, and whether or not the end position number of the demarcating line K is greater than the value of "E$KETA" inclusive. On the basis of the results of the decision mentioned above, it is then decided whether or not the row designated by the value of "E$GYOU" is located at the end of the movable block. If the answer of this decision is false (No), the value of the variable K is incremented by one (step 810), whereupon the step 808 is regained. On the other hand, when the result of the abovementioned decision is true (Yes), the start row number "S$GYOU", the end row number "E$GYOU" and the number of the rows constituting the movable unit are stored in the movable block table 300, while the location of the movable block table 300 where the above mentioned data are stored is written in the movable block management table (step 811). Then, the value of "KEY$NO" is compared with that of the designated key number "KEY$NUM" (step 812). When the value of "KEY$NO" is smaller than that of "KEY$NUM", the location of the movable block table written in the move block management table at the step 811 is stored in "STACK(CP)" (step 813), whereon "CP" is incremented by "1" (step 814) with the value of "KEY$NO" being incremented by "1" (step 815). Thereafter, return is made to the step 804.

On the other hand, when it is decided at the step 812 that the value of "KEY$NO" is greater than that of "KEY$NUM" inclusive, comparison is performed between the value of "E$GYOU" and the end row of the movable block stored in the movable block table at the location designated by STACK(CP−1) at a step 816. When the result of the comparison is true, the value of "CP" is decremented by "1" at a step 817, whereon the value "E$GYOU" of the abovementioned movable block table is placed in "E$GYOU" at a step 818, while the value of "E$GYOU" resulting from incrementation of "1" is placed in "S$GYOU" at a step 820. Further, the value of "KEY$NO" is decremented by "1" at a step 821. Then, return is made to the step 804. On the contrary, when the result of execution of the step 816 is false, the value resulting from the addition of the value of "E$GYOU" with "1" is placed in "S$GYOU" at a step 818, being then followed by the return to the step 804.

Further, when the result of execution of the step 808 is false (No), the value of "E$GYOU" is incremented by "1" at a step 822, whereon the step 807 is regained.

When the result of execution of the step 805 is true, the start row number "S$GYOU", the end row number "E$GYOU" and the number of the rows constituting the movable unit are stored in the movable block table 300, while the corresponding storage location of the movable block table is written in the movable block management table at a step 823, whereupon the processing for indexing the movable unit comes to an end.

Next, the key data of the movable unit is cut out at a step 104.

Figure 10:
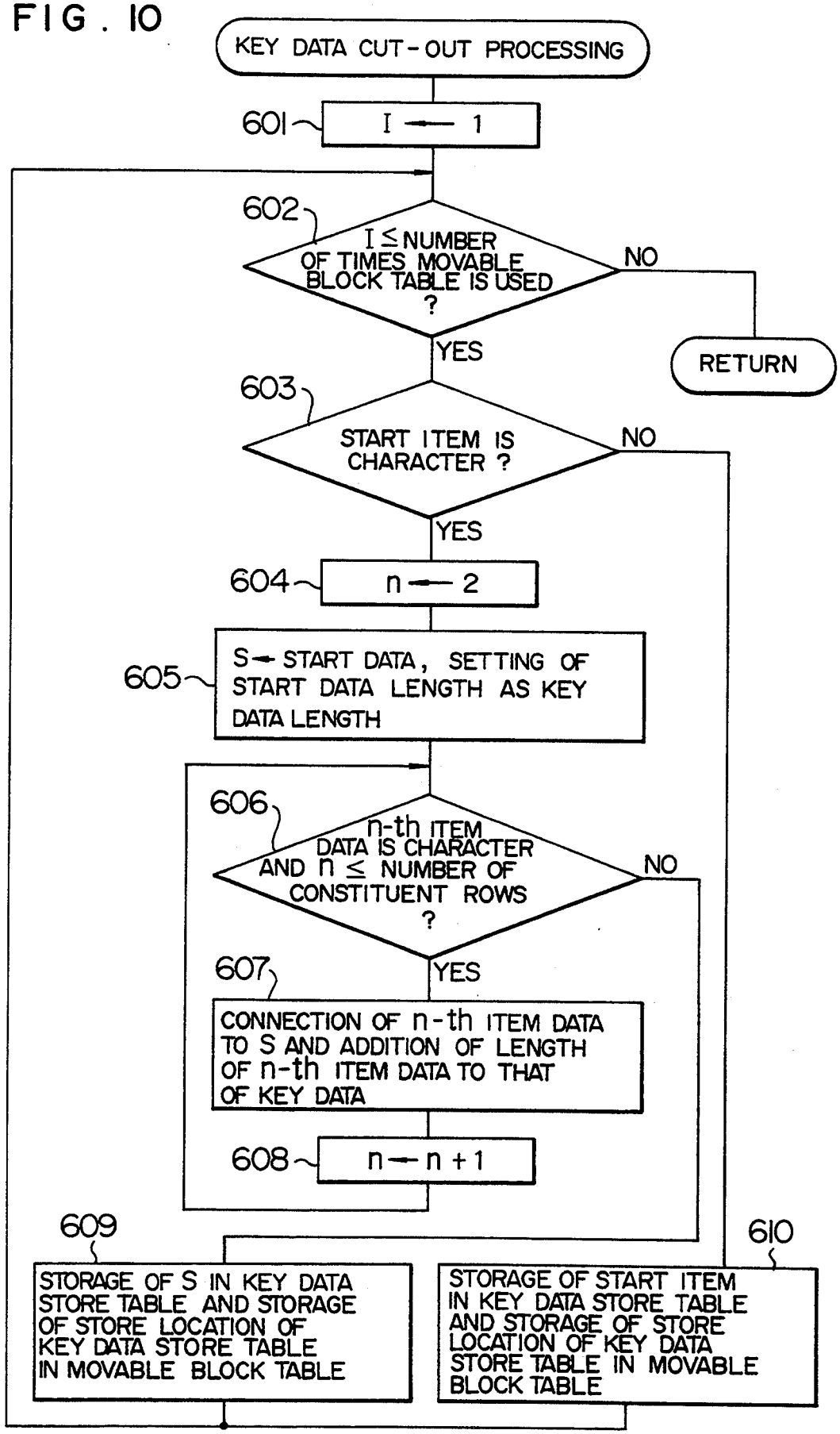
FIG. 10 is a flow chart for illustrating how a key data cutting-out processing step (104) shown in FIG. 1 can be executed.

The processing for cutting out the key data will now be described by reference to FIG. 10.

At first, a variable I indicating the identification number of the movable unit is set to the initial value of "1" at a step 601. Next, at a step 602, it is decided whether the value of the variable I is smaller than the number of times the move block table has been used, wherein the processing proceeds to a step 603 if the answer of the above decision is affirmative, while otherwise the processing for cutting out the key data is completed (step 602).

At the step 603, decision is made as to whether the start item of the key column is a character or a numeral. If the start item is a character, a variable n is set to "2" at a step 604, whereon the start item data is stored in a character column storage area S at a step 605.

When it is decided at a next step 606 that the n-th item of the key column is a character and that the variable n is smaller than the number of the rows constituting the movable unit, the n-th item data of the key column is connected to the character column storage area S at a step 607, being followed by a step 608 where the variable n is incremented by "1". The processing then returns to the step 606.

On the other hand, when the result of the decision step 606 is false (No), the character column storage area S is stored in the key data storage table 700, while the storage location in the key data storage table 700 and the key data length are stored in the movable block table 300 (step 609), whereupon return is made to the step 602.

When the result of the decision step 603 is false, the start item data of the key column is stored in the key data storage table 700, while the storage location of the key data storage table 700 and the length of the key data are stored in the movable block table at a step 610, whereupon the step 602 is regained.

Through the processing described above, the key data can be cut out.

Now, the sort execution processing is performed at a step 105 on the basis of the key data derived from the key data length 308 and the storage location 309 of the key data of the movable unit.

Figure 11:
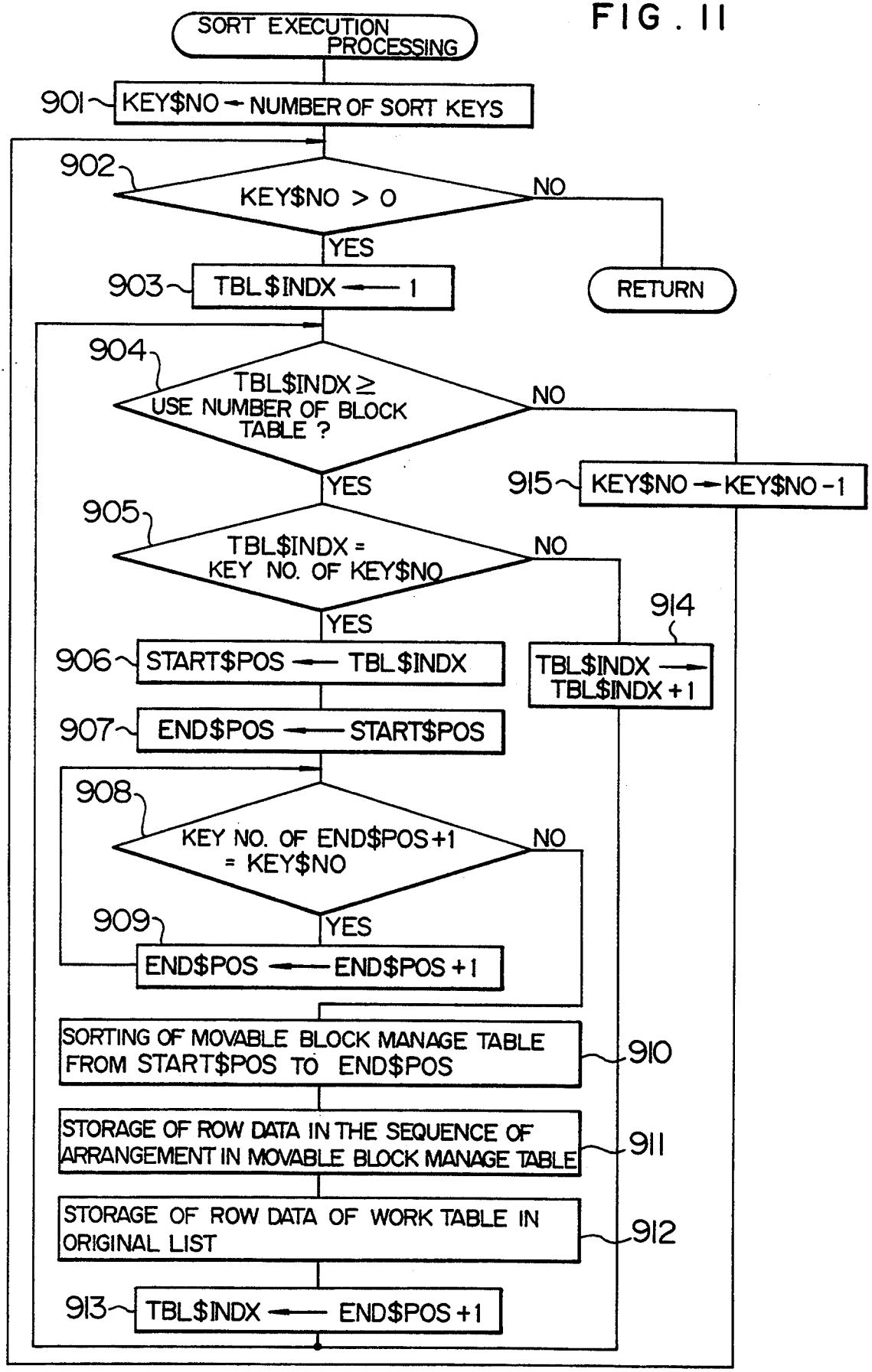
FIG. 11 is a flow chart for illustrating in what manner a sort execution processing step (105) shown in FIG. 1 can be executed.

The sort execution processing will be described below by reference to FIG. 11. In the first place, a sort key number designated by the operator is placed in the variable "KEY$NO" representing the key number which is currently subject to the sorting at a step 901. Comparison is then made between the value of "KEY$NO" and "0" at a step 902. When the value of "KEY$NO" is greater than "0", an affix variable "TBL$INDX" used for searching the movable block table is set to the initial value of "1" at a step 903. On the other hand, when the value of "KEY$NO" is smaller than or equal to "0", the sort execution processing is completed. Next, at a step 904, the value of "TBL$INDX" is compared with the number of times the movable block table has been used. When the former is smaller than the latter, the key number of the movable block table designated by the value of "TBL$INDX" is compared with the value of "KEY$NO" at a step 905. When equality is found, a variable "START$POS" indicating the start position of the movable unit is set to the value of "TBL$INDX" at a step 906. On the other hand, when the value of "TBL$INDX" is found to be greater than the number of times the movable block table has been used at the step 904, the value of "KEY$NO" is decremented by "1" (step 915), whereupon return is made to the step 902. Further, unless equality is found between the key number of the movable block table indicated by the value of "TBL$INDX" and the value of "KEY$NO" at the step 905, the value of "TBL$INDX" is incremented by "1" at a step 914, whereupon return is made to the step 904. Subsequently, the value of "STRT$POS" is set to the variable "END$POS" indicating the end row position of the movable unit at a step 907, which is then followed by a step 908 where the key number of the movable block table designated by the value of "END-$POS+1" is compared with the value of "KEY$NO". When the comparison results in equality or coincidence, the value of "END$POS" is incremented by "1" at a step 909, whereupon return is made to the step 908. When inequality is found at the comparison step 908, the movable block management table is sorted within a range from the row "START$POS" to the row "END-$POS" of the list with the aid of the key stored in the movable block table (step 910). Subsequently, the row data resulting from the sort are stored in the work table in the order of the array within the movable block management table at a step 911. Further, the row data in the work table is stored in the original list at a step 912. Thereafter, the value of "END$POS+1" is then placed in "TBL$INDX" at a step 913, whereupon return is made to the step 904. In this manner, the sort execution processing is carried out.

It should be mentioned that the sorting can be accomplished through the procedure described above even when a plurality of keys are designated by the operator.

Next, description will be made of a typical application of the processing described above to the sorting of an actual booking sheet.

Figures 13, 14:
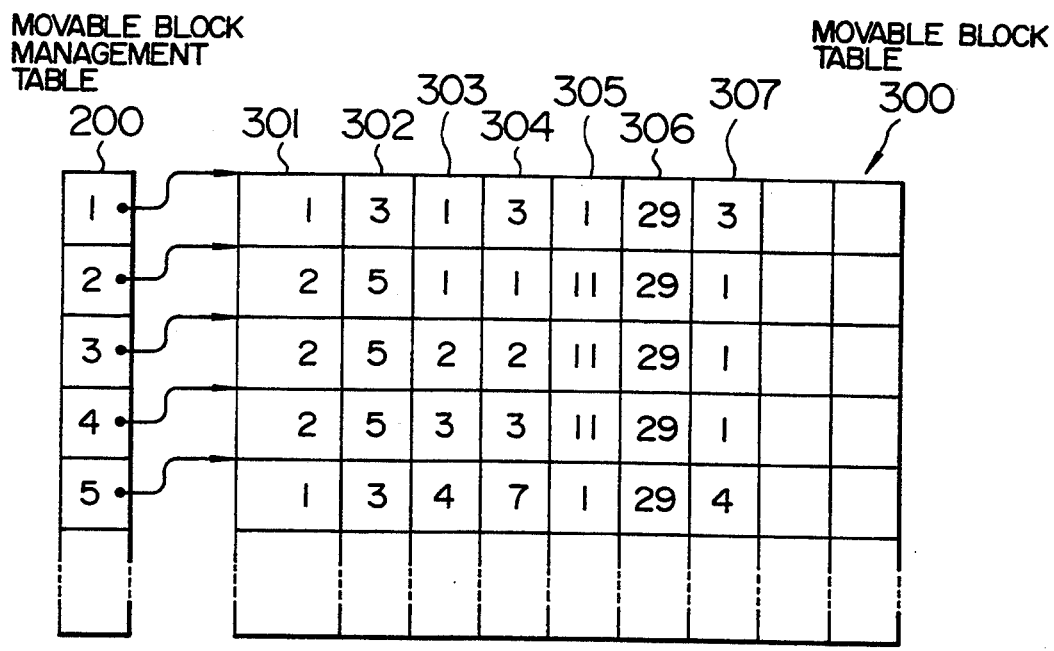
FIG. 13 is a view showing the contents of a demarcating line table which correspond to the state shown in FIG. 12.
FIG. 14 is a view showing a movable block table in the state in which information concerning the indexing of movable blocks is stored.

FIG. 12 shows the booking sheet in the start in which movable units are defined by the operator by drawing the demarcating lines for the sorting. The corresponding state of the demarcating line table 30 is illustrated in FIG. 13. Parenthetically, the attribute information 31 is assumed to include only the information about the directions of the demarcating lines for convenience of description.

As the conditions for the sorting, it is presupposed that the unit for the sorting includes a plurality of rows, the first key column is the third column (BANK CODE), the second key column is the fifth column (AMOUNT), the objective of the first key is literal characters, the objective of the second key is numeric characters, the sorting sequence of the first key is in the ascending order, and the sorting sequence of the second key is in the descending order.

When the movable unit indexing processing (processing step 103) is executed, the indexed information of the movable unit is stored in the movable block management table 200 and the movable block table 300 in such a manner as shown in FIG. 14. In the case of this example, the first row data indicate that the first movable unit includes the first to third rows and the first to 29-th positions, as shown at columns denoted by reference numerals 303, 304 and 305, 306 in FIG. 14. Further, it can be seen that the key is the first key, as indicated at a column 301, the key column is the third column as indicated at 302, and that the number of rows constituting the movable unit of concern is three, as indicated at 307.

Figure 15:
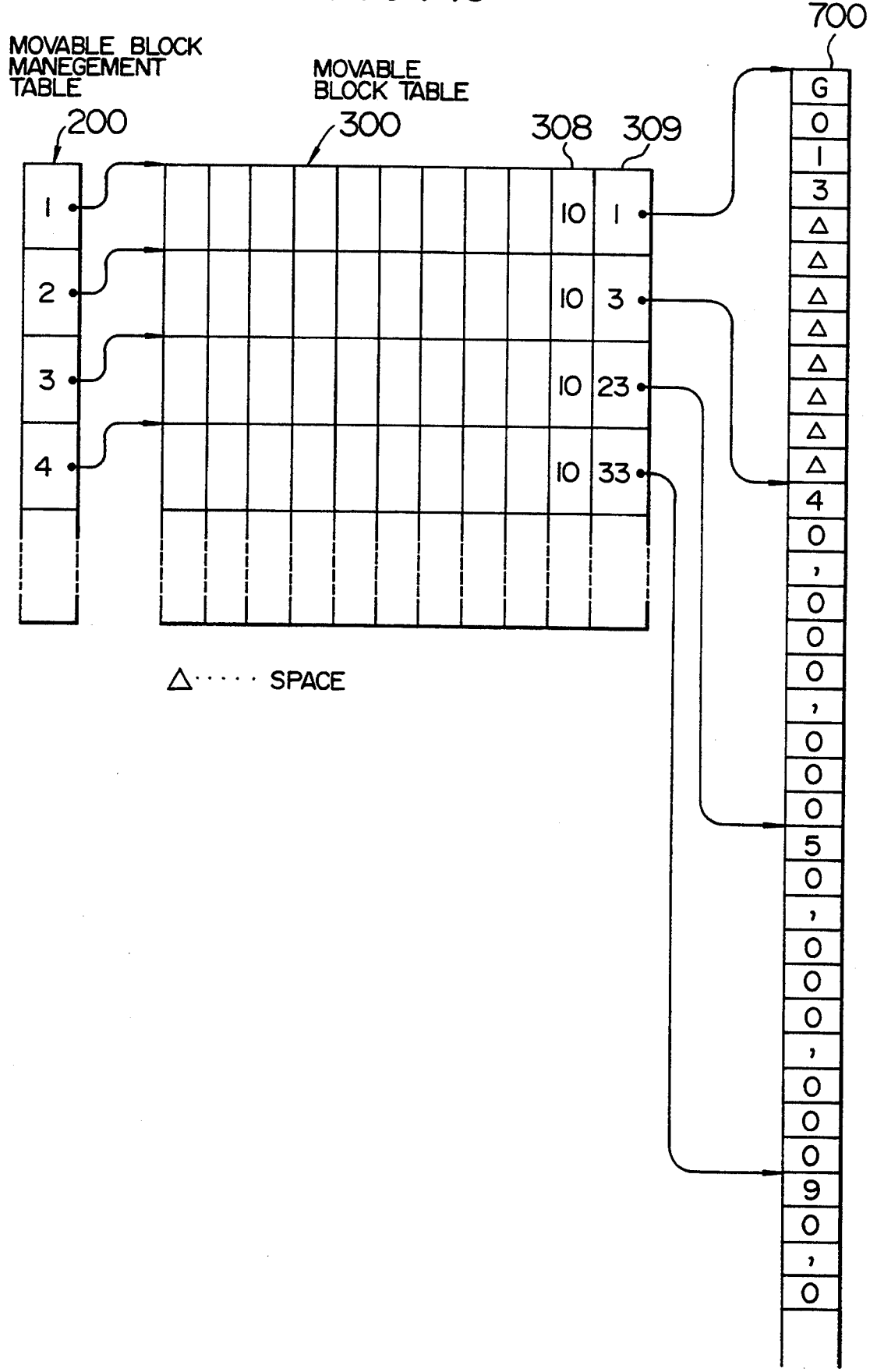
FIG. 15 is a view illustrating the state in which information has been stored in succession to the processing for cutting out the data of key columns.

When the processing for cutting out the data of the key column is performed at the step 104 as described hereinbefore, the key data of the individual movable units are stored at the key data length locations 308 of the movable block table 300, the pointers 309 indicating the corresponding areas of the movable unit key data storage table 700 and the key data storage table 700, as shown in FIG. 15.

Figures 16, 17:
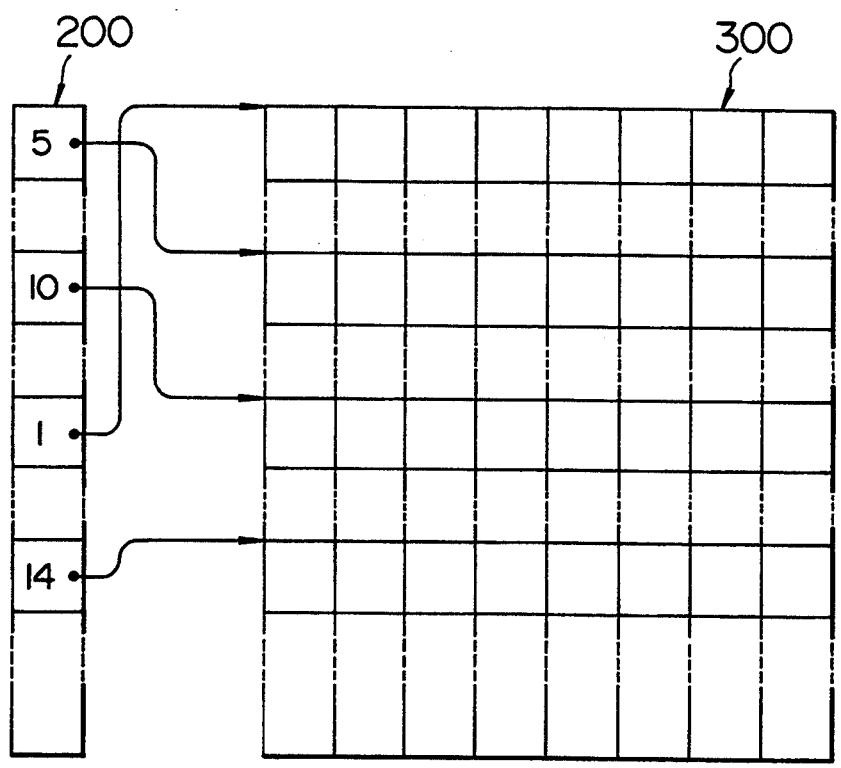
FIG. 16 is a view for illustrating the state of a movable block management table on the assumption that the sorting is performed by using a first key and a second key.
FIG. 17 is a view showing the state of a work table in which the row data has been stored, starting from the state of the table shown in FIG. 16.

Subsequently, the sort execution processing is performed at the step 105 on the basis of the key data cut out at the step 104. To this end, the movable block management table 200 is sorted, whereon the row data are stored in the work table in accordance with the result of the sort processing mentioned above. Further, the row data are written again in the table on the basis of the data of the work table. FIGS. 16 to 18 are views for illustrating the sort processing performed with the aid of the first and second keys, wherein FIG. 16 shows the state of the movable block management table 200 after the sorting, FIG. 17 shows the state of the work table 400 in which the line data have been stored on the basis of the result shown in FIG. 16, and FIG. 18 shows the state of the original table in which the line data shown in FIG. 17 have been written again.

As will be appreciated from the foregoing description, it is possible according to the teaching of the invention incarnated in the illustrated embodiment to detect automatically the movable units for every key on the basis of the demarcating lines to thereby perform the sorting on a plural-row basis.

In the foregoing description, it has been assumed, by way of example only, that the list data are arranged in the form of a table. It should however be understood that the present invention can equally be applied to character strings and/or numeral strings which are not marked off in a table.

According to the present invention, the list data sorting can be carried out on a plural-row basis with facility being maintained in viewing and understanding the list data by demarcating the unit or block capable of being moved with demarcating lines or the like inputted to the list data displayed on the display device of the data processing apparatus.

I claim:

1. A method of controlling sorting of list data in a data processing apparatus which includes input means for inputting characters and commands, display means for displaying list data, control means for controlling said input means and said display means, said method comprising the steps of:

defining a plurality of blocks for demarcating said list data displayed on said display means;

identifying discriminatively blocks for rearranging said list data;

rearranging the list data located within said identified blocks, in the form of a movable block having a plurality of lines; and displaying the rearranged list data on said display means;

wherein said defining step includes a step of generating blocks for demarcating the list data displayed on said display means and arranged in an array of rows and columns, and wherein said rearranging step includes a step of rearranging all the rows of the list data located within said blocks in the form of rearrangable units;

wherein said defining step further includes a step of establishing in the list data displayed on said display means and arranged in an array of rows and columns the blocks for demarcating said list data, said blocks bearing hierarchical relating to one another, and wherein said rearranging step further includes a step of rearranging in the form of rearrangable blocks all the rows of the list data located within said blocks in accordance with the hierarchical relation of the blocks to which the rows belong.

2. A method of controlling sorting of list data in a data processing apparatus which includes input means for inputting characters and commands, display means for displaying list data, control means for controlling said input means and said display means, said method comprising the steps of:

defining a plurality of blocks for demarcating said list data displayed on said display means;

identifying discriminatively blocks for rearranging said list data;

rearranging the list data located within said identified blocks, in the form of a movable block having a plurality of lines; and displaying the rearranged list data on said display means;

wherein said defining step includes a step of generating blocks for demarcating said list data which are displayed on said display means and arrayed in the form of rows and columns;

wherein said rearranging step includes the steps of:

defining all the rows of the list data located within said blocks as row blocks for rearrangement, respectively, making a decision for each of the row blocks whether each of the row blocks is constituted by a string of literal characters or by a string of numeric characters contained in each of the rows, identifying each row block constituted by the string of literal characters having a number of characters greater than a predetermined value, the string forming a sentence together with a succeeding row block to thereby form a connected block for rearrangement, and rearranging the list data for each of the row blocks and the connected blocks.

* * * * *